(12) United States Patent
Mattos et al.

(10) Patent No.: US 7,753,192 B2
(45) Date of Patent: Jul. 13, 2010

(54) APPARATUS AND METHOD FOR ORIENTING SPHEROIDAL CONTAINERS AND PACKAGING BEVERAGES IN SPHEROIDAL CONTAINERS

(75) Inventors: Nilton Antonio Moreira Mattos, Rio de Janeiro (BR); Alexandre Guedes Simões, Rio de Janeiro (BR); Paulo Roberto da Silva, Ribeirao Preto (BR)

(73) Assignee: The Coca-Cola Company, Atlanta, GA (US)

( * ) Notice: Subject to any disclaimer, the term of this patent is extended or adjusted under 35 U.S.C. 154(b) by 623 days.

(21) Appl. No.: 11/614,602

(22) Filed: Dec. 21, 2006

(65) Prior Publication Data

US 2007/0209328 A1 Sep. 13, 2007

Related U.S. Application Data

(60) Provisional application No. 60/753,389, filed on Dec. 23, 2005.

(51) Int. Cl.
*B65G 47/24* (2006.01)
(52) U.S. Cl. .......................... 198/402; 198/620; 193/46
(58) Field of Classification Search ................. 198/402, 198/403, 405, 406, 620; 193/2 P, 12, 27, 193/46; 53/282; 141/144
See application file for complete search history.

(56) References Cited

U.S. PATENT DOCUMENTS

| | | | | |
|---|---|---|---|---|
| 2,252,498 A | * | 8/1941 | Flaws, Jr. ..................... | 221/14 |
| 3,224,552 A | | 12/1965 | McNeill | |
| 3,297,130 A | | 1/1967 | Greck | |
| 3,331,486 A | * | 7/1967 | Towry ........................ | 198/380 |
| 3,495,291 A | * | 2/1970 | Copping et al. ............... | 15/304 |
| 3,583,544 A | | 6/1971 | Prodzenski et al. | |

(Continued)

FOREIGN PATENT DOCUMENTS

EP 0134608 A 3/1985

(Continued)

OTHER PUBLICATIONS

International Search Report - PCT/US2006/049228.

(Continued)

*Primary Examiner*—Douglas A Hess
(74) *Attorney, Agent, or Firm*—Sutherland Asbill & Brennan LLP

(57) ABSTRACT

An apparatus for orienting a spheroidal container comprising a spheroidal body and a neck portion and the method for using the same, the apparatus comprising a container feeder, a channel having a longitudinal gap and arranged for receiving the spheroidal containers from the container feeder and operative to orient the spheroidal containers in an upside down orientation with the body supported by the channel and the neck portion extending below the spheroidal body and into the longitudinal gap; and a twister for receiving the spheroidal containers in the upside down orientation and inverting the spheroidal containers. An apparatus for packaging a beverage in a spheroidal container and the method for using the same, comprising the apparatus for orienting a spherical container and further comprising a filler for receiving the spheroidal containers and filling the spheroidal containers with the beverage, and a sealer for sealing the beverage in the spheroidal containers.

18 Claims, 3 Drawing Sheets

U.S. PATENT DOCUMENTS

| | | | |
|---|---|---|---|
| 3,589,094 A | | 6/1971 | Pearson |
| 3,797,624 A | * | 3/1974 | Powell et al. ............. 193/25 R |
| 3,924,732 A | | 12/1975 | Leonard |
| 4,031,764 A | * | 6/1977 | Curtis ........................... 74/57 |
| 4,104,081 A | * | 8/1978 | Totten ......................... 134/23 |
| 4,312,437 A | | 1/1982 | Suzuki et al. |
| 4,465,176 A | | 8/1984 | Long |
| 4,479,574 A | | 10/1984 | Julius et al. |
| 4,819,785 A | | 4/1989 | Ichizawa et al. |
| 5,154,270 A | * | 10/1992 | Camezon .................. 193/25 R |
| 5,186,307 A | * | 2/1993 | Doudement et al. ......... 198/454 |
| 5,277,207 A | * | 1/1994 | Perrier ........................ 134/44 |
| 5,810,151 A | | 9/1998 | Catelli et al. |
| 6,082,418 A | * | 7/2000 | Naecker et al. ............. 141/145 |
| 7,121,062 B2 | * | 10/2006 | Till .............................. 53/167 |
| 7,299,832 B2 | * | 11/2007 | Hartness et al. ............. 141/144 |
| 7,337,893 B2 | * | 3/2008 | Charpentier ................ 198/454 |
| 7,343,720 B2 | * | 3/2008 | Brown ....................... 53/331.5 |

FOREIGN PATENT DOCUMENTS

| | | |
|---|---|---|
| EP | 0390256 A | 10/1990 |
| GB | 1533581 A | 11/1978 |

OTHER PUBLICATIONS

Notification of Transmittal of the International Preliminary Report on Patentability - PCT/US2006/049228.
European Patent Office Action - 06 848 136.5 -1261.

* cited by examiner

APPARATUS AND METHOD FOR ORIENTING SPHEROIDAL CONTAINERS AND PACKAGING BEVERAGES IN SPHEROIDAL CONTAINERS

RELATED APPLICATION DATA

The present application claims priority under 35 U.S.C. §119(e) to U.S. Provisional Application No. 60/753,389, entitled "Apparatus and Methods for Orienting Spheroidal Containers and Packaging Beverages in Spheroidal Containers," filed on Dec. 23, 2005, which is hereby incorporated by reference in its entirety.

FIELD OF INVENTION

This invention relates generally to an apparatus for handling spheroidal containers. In a particular embodiment, this invention relates to such an apparatus orienting spheroidal containers during the transfer from mass production to filling lines in a packaged beverage manufacturing facility.

BACKGROUND OF INVENTION

Bottling plants typically comprise bottle feed lines on which bottles are advanced individually in a single line. The bottles are fed to various parts of the plant to undergo processes such as washing, sterilization, filling, and sealing.

While several container transport apparatus are known for handling traditional bottles with a cylindrical shape, they are ineffective at handling spheroidal containers. A unique challenge of handling spheroidal containers is that the spheroidal container lacks the longitudinal sides present on cylindrical containers. When a large quantity of spheroidal bottles are introduced to the bottling process in different orientations, the lack of longitudinal sides makes it more difficult to orient the spheroidal container in the proper position for processing. Accordingly, there is a need for an apparatus for handling spheroidal containers in bottling plants.

SUMMARY OF INVENTION

This invention addresses the above-identified needs by providing an apparatus for handling spheroidal containers in bottling plants. This apparatus is capable of transferring spheroidal containers from mass production to filling lines in a packaged beverage manufacturing facility.

More particularly, this invention comprises an apparatus for handling spheroidal containers comprising a container feeder, a channel having a longitudinal gap and arranged for receiving the spheroidal containers from the container feeder and arranging the speroidal containers in an upside down orientation, and a twister for inverting the spheroidal containers from the upside down orientation to a right-side up orientation. The container feeder controls the flow of the spheroidal containers into the channel. The channel operates to orient the spheroidal containers in an upside down orientation with the body supported by the channel and the neck portion extending below the spheroidal body and into the longitudinal gap. The twister then inverts the spheroidal containers from the upside down orientation to a right-side up orientation for further processing.

In a particular embodiment, the channel further comprises a pair of rods rotatably mounted along respective sides of the channel gap to engage the spheroidal containers as the spheroidal containers are oriented in the channel. A rotating means rotates the rods in opposite directions, wherein both rods push up on the spheroidal containers to assist in the orienting of the spheroidal containers.

Furthermore, according to another embodiment, this invention comprises an apparatus for packaging a beverage in spheroidal containers comprising the above-described apparatus for handling spheroidal containers, and further comprising a filler for receiving the spheroidal containers in the right-side up orientation and filling the spheroidal containers with the beverage, and a sealer for sealing the beverage in the spheroidal containers.

Further still, this invention encompasses the method for handling spheroidal containers and the method for packaging a beverage in a spheroidal container.

Other objects, features, and advantages of this invention will be apparent from the following detailed description, drawings, and claims.

DETAILED DESCRIPTION OF THE INVENTION

As summarized above, this invention encompasses an apparatus for handling spheroidal containers in bottling plants. Such spheroidal containers are desirable for packaging fluid products, such as beverages. Embodiments of this invention are described in detail below and illustrated in FIGS. 1-6.

Figure 1:
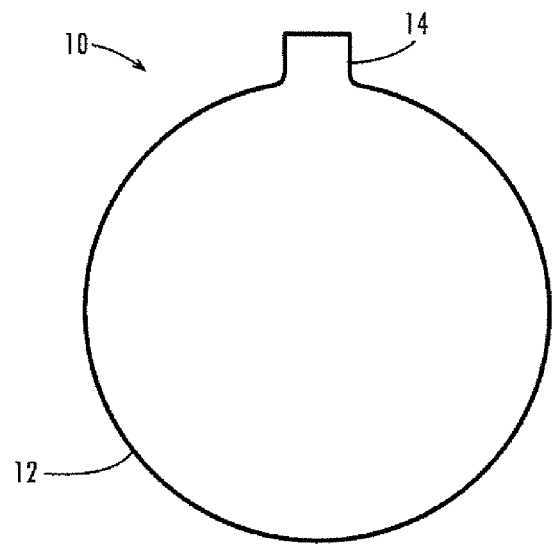
FIG. 1 shows a elevation view of an embodiment of a spherical container.
Figure 2:
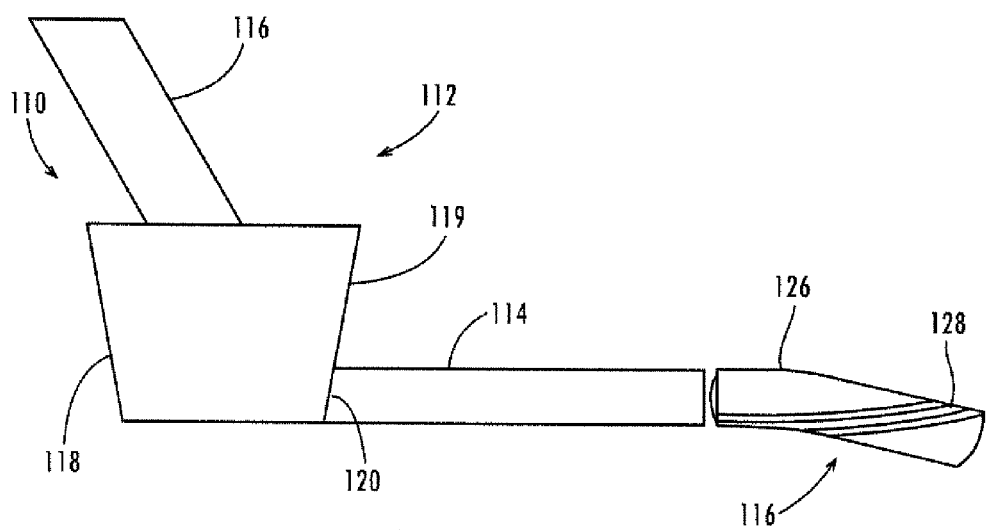
FIG. 2 shows a elevation view of an apparatus for orienting spherical containers in accordance with an embodiment of this invention.
Figure 3:
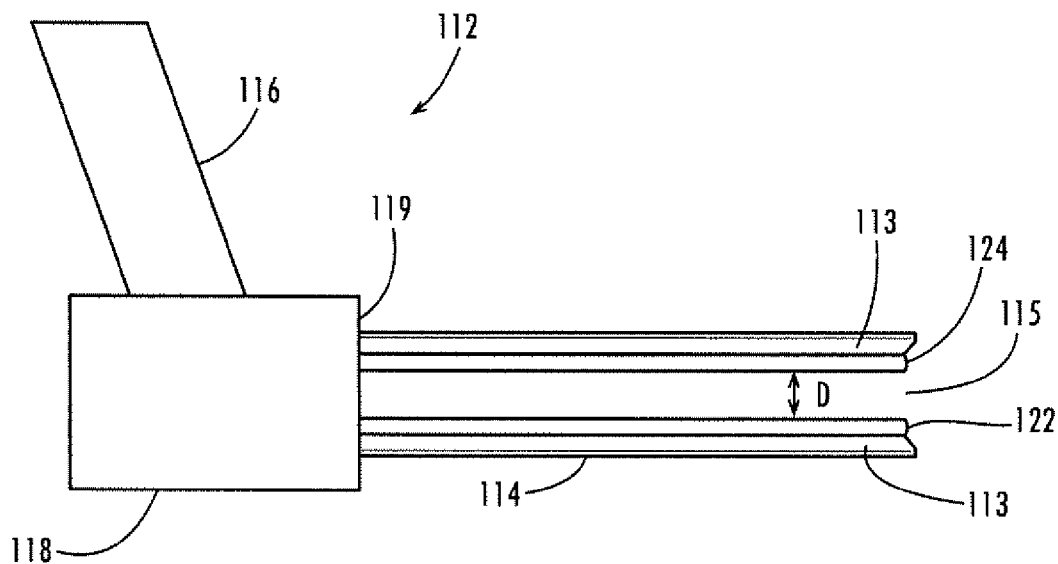
FIG. 3 shows a partial plan view of the embodiment in FIG. 2 illustrating an apparatus for orienting spherical containers.
Figure 4:
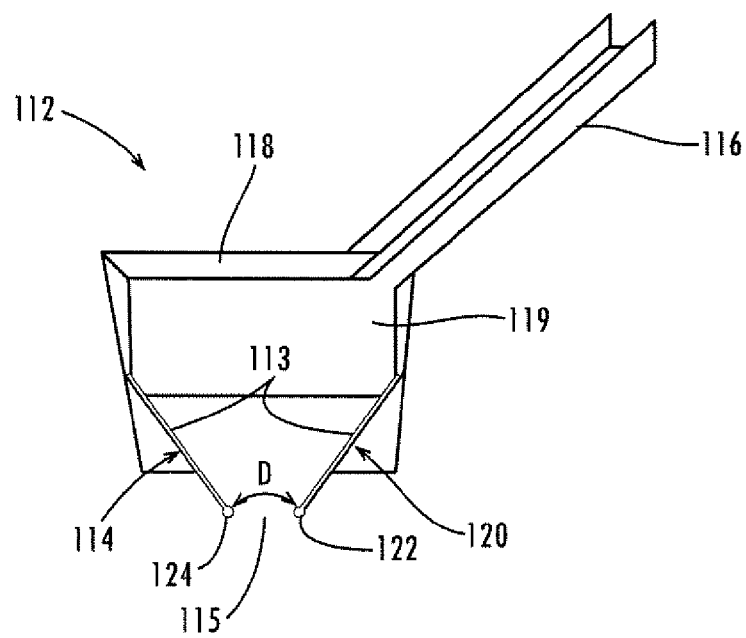
FIG. 4 shows a partial elevation view of the embodiment in FIG. 2 illustrating an apparatus for orienting spherical containers.

Spheroidal containers may be introduced to processing from bulk shipments with haphazard orientation of the spheroidal containers. A spheroidal container 10, an embodiment of which is illustrated in FIG. 1, comprises a structure similar to traditional bottles with the caveat of a spheric body shape. The spheroidal container 10 comprises a body portion 12 with the shape of a sphere and a neck portion 14 wherein there is an opening 16 by which the spheroidal container 10 may be filled or emptied. Due to the difficulty of handling a spheric body portion 12, spheroidal containers 10 require a novel process to properly orient the spheroidal containers for processing. The apparatus 110 illustrated in FIGS. 2-5 addresses this need by orienting and feeding the spheroidal containers 10 for further processing. Although the spheroidal container 10 has a body portion 12 with the shape of a sphere, embodiments of this invention are capable of handling containers with spheroidal shapes other than a sphere, such as oblong, egg-shaped, and the like.

As shown in FIGS. 2-5, the apparatus 110 comprises a container feeder 112, a channel 114 for orienting the spheroidal containers 10, and a twister 116 for inverting the spheroidal containers 10. The container feeder 112 has two functions. First, the container feeder 112 prevents accumulation of the spheroidal containers 10 in the channel 114, avoiding overflow of the spheroidal containers 10 from the channel 114. Second, the container feeder 112 aids in the positioning of the spheroidal containers 10 by permitting only a single line of spheroidal containers 10 into the channel 114. The container feeder 112, which may embody a hopper, comprises a chute 116 for feeding the spheroidal containers 10 to a funnel 118. The funnel 118 has an open top, enclosed base and sides, and a passage to the channel 114 at the base of a funnel side 120, formed by a détente member 119 spaced above the base of the funnel 120 and the channel 114.

The channel 114 comprises juxtaposed side members 113 with a longitudinal gap 115 therebetween. The channel 114 is arranged for receiving the spheroidal containers 10 from the container feeder 112 and operates to orient the spheroidal containers 10 in an upside down orientation with the body supported by the channel and the neck portion extending below the spheroidal body and into the longitudinal gap 115. The channel 114 further comprises a pair of rods 122, 124 rotatably mounted along respective ones of the side members 113 adjacent the longitudinal gap 115. The rods 122, 124 are separated by a distance D that is at least as large the diameter of the neck portion 14 of the spheroidal container 10. The channel 114 further comprises a means for rotating the rods 122, 124, wherein the rods 122, 124 rotate in opposite directions at the same speed, pushing up on the spheroidal containers 10 to orient the spheroidal containers 10 upside down with the neck portion 14 of the spheroidal container 10 between the rods 122, 124 and extending into the longitudinal gap 115. Desirably, the right rod 122 rotates clockwise and the left rod 124 rotates counter-clockwise. The rods 122, 124 desirably are slightly curved to assist in the positioning of the spheroidal containers 10.

Alternatively, means other than the rotating rods 122, 124 call be used to agitate the spheroidal containers 10 as they travel along the channel 114 so that the spheroidal containers are eventually oriented in the upside down orientation and do not become stuck in another orientation. Such other agitation means can include a vibrator or ultrasonic device for vibrating the channel 114.

Figure 5:
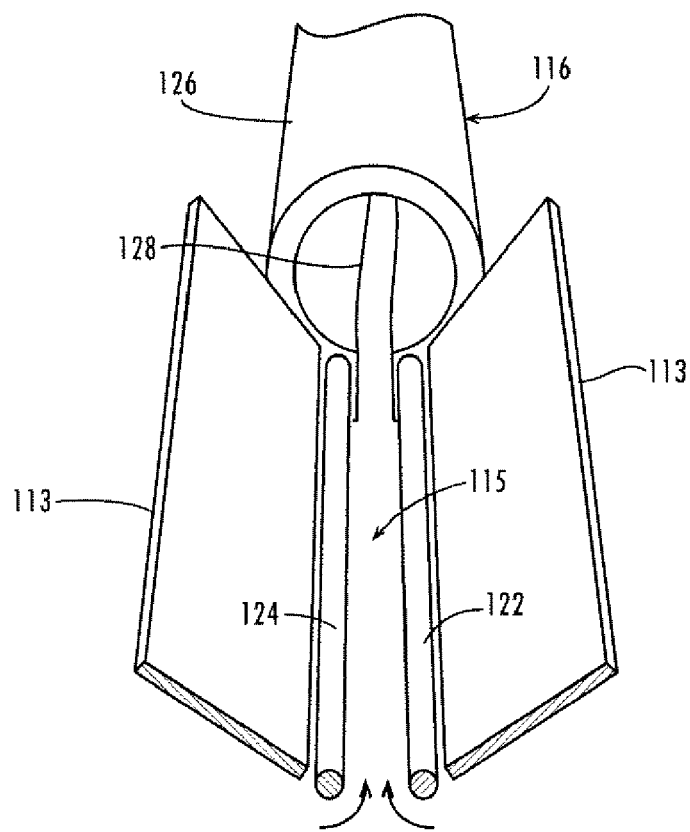
FIG. 5 shows a partial perspective view of the embodiment in FIG. 2 illustrating the entrance to the twister.

The channel 114 feeds the spheroidal containers 10 upside down to the twister 116 for inversion. The twister 116 comprises a tube 126 with a helical opening 128 or slot extending longitudinally along the tube for receiving the neck portion 14 of the spheroidal container 10. The helical opening 128 is at least as large the diameter of the neck portion 14 of the spherical container 10. The twister 116 pneumatically moves the spheroidal containers 10 through the twister 116 and is slightly declined as it extends away from the channel 114 to assist with movement of the spheroidal containers 10 through the twister. As best shown in FIG. 5, the longitudinal gap 115 between the side members 113 of the channel 114 is aligned with the helical opening 128 of the twister 116 at the entrance to the twister for receiving the neck portion 14 of the spheroidal containers 10 as the spheroidal containers passes from the channel to the twister. The helical opening 128 is structured and arranged to invert the spheroidal containers 10 from the upside down orientation in the channel to a right side up orientation as they travel through the twister. Thus, at the exit of the twister 116 the spherical bottles 10 are oriented right-side up for further processing such as, but not limited to, washing, sterilizing, filling, sealing, and/or labeling.

The container feeder 112, channel 114, and twister 116 may be made with numerous materials. Such materials are well known in the art and include stainless steel, aluminum, tin plate, painted steel, and plastic. Desirably, the container feeder 112, channel 114, and twister 116 are comprised of stainless steel because stainless steel is preferable in the food industry. The rods 122, 124 should comprise stainless steel because they are subject to constant abrasion.

Figure 6:
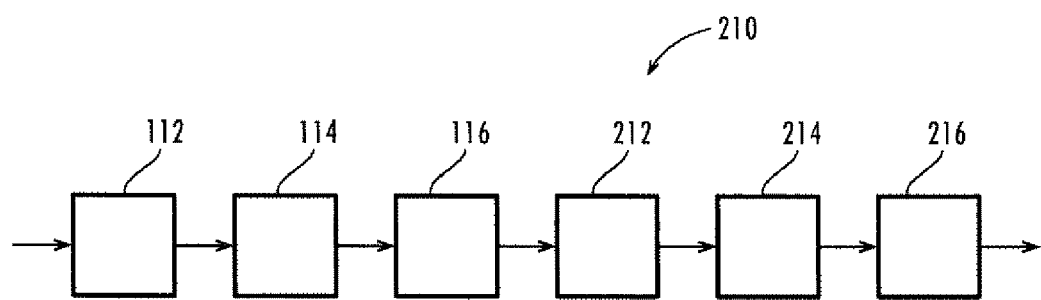
FIG. 6 shows a schematic diagram of a beverage packaging system.

Another embodiment of this invention, illustrated schematically in FIG. 6, comprises an apparatus 210 for packaging a beverage in spheroidal containers 10. The apparatus 210, which comprises the above-described apparatus 110 for orienting spheroidal containers 10, comprises a container feeder 112, a channel 114, and a twister 116 for orienting the spheroidal containers 10 right-side up. The apparatus 210, further comprises a washer and sterilizer 212 for cleaning the bottles, a filler 214 for filling the spheroidal containers 10 with the beverage, and a sealer 216 for sealing the beverage in the spheroidal containers 10. The washer and sterilizer 212, the filler 214, and the sealer 216 are not described herein in detail because their structure and function are well known to those skilled in the art.

This invention also encompasses a method for orienting spheroidal containers 10, the method first comprising the step of feeding the spheroidal containers 10 to a channel 114 having a longitudinal gap 115 and orienting the spheroidal containers 10 in an upside down orientation with the body 12 supported by the channel 114 and the neck portion 14 extending below the spheroidal body 12 into the longitudinal gap 115. The method further comprises the step of feeding the spheroidal containers 10 from the channel 114 to the twister 116 and twisting the spheroidal containers 10 in the twister 116 so that the spheroidal containers 10 are inverted upon exiting the twister 116.

This invention further comprises a method for packaging a beverage in a spheroidal container 10, the method comprising the steps of the above-described method for orienting a spheroidal container 10 and further comprising the steps of washing and sterilizing the spheroidal containers 10, filling the spheroidal containers 10 with the beverage, and sealing the beverage in the spheroidal containers 10.

It should be understood that the foregoing relates to particular embodiments of the present invention, and that numerous changes may be made therein without departing from the scope of the invention as defined from the following claims.

We claim:

1. An apparatus for orienting spheroidal containers comprising a spheroidal body and a neck portion extending from the body, the apparatus comprising:

a container feeder comprising a hopper;

a channel having a longitudinal gap and arranged for receiving the spheroidal containers from the container feeder and operative to orient the spheroidal containers in an upside down orientation with the body supported by the channel and the neck portion extending below the spheroidal body and into the longitudinal gap; and a twister for receiving the spheroidal containers in the upside down orientation and inverting the spheroidal containers as the spheroidal containers travel through the twister;

wherein the channel is sloped downwardly from the container feeder to the twister.

2. Apparatus as in claim 1 wherein the channel comprises juxtaposed side members with a longitudinal gap therebetween, the channel arranged for receiving the spheroidal containers from the container feeder and operative to orient the spheroidal containers in an upside down orientation with the body supported by the side members and the neck portion extending below the spheroidal body and through the gap and wherein the twister comprises a tube with a helical opening extending longitudinally along the tube for receiving the neck portion of the spheroidal containers in the upside down orientation so that the spheroidal containers are inverted as the spheroidal containers travel through the twister.

3. Apparatus as in claim 1 wherein the twister is sloped downwardly from the channel.

4. An apparatus for orienting spheroidal containers comprising a spheroidal body and a neck portion extending from the body, the apparatus comprising:
 a container feeder comprising a hopper;
 a channel having a longitudinal gap and arranged for receiving the spheroidal containers from the container feeder and operative to orient the spheroidal containers in an upside down orientation with the body supported by the channel and the neck portion extending below the spheroidal body and into the longitudinal gap; and
 a twister for receiving the spheroidal containers in the upside down orientation and inverting the spheroidal containers as the spheroidal containers travel through the twister;
 wherein the hopper comprises a chute for receiving the spheroidal containers and a funnel for feeding the spheroidal containers from the chute to the channel.

5. An apparatus for orienting spheroidal containers comprising a spheroidal body and a neck portion a extending from the body, the apparatus comprising:
 a container feeder;
 a channel having a longitudinal gap and arranged for receiving the spheroidal containers from the container feeder and operative to orient the spheroidal containers in an upside down orientation with the body supported by the channel and the neck portion extending below the spheroidal body and into the longitudinal gap, wherein the channel comprises a pair of rods rotatably mounted along respective ones of the side members adjacent the gap so that the rods engage the spheroidal containers as the channel orients the spheroidal containers; and
 a twister for receiving the spheroidal containers in the upside down orientation and inverting the spheroidal containers as the spheroidal containers travel through the twister.

6. Apparatus as in claim 5 further comprising means for rotating the rods.

7. Apparatus as in claim 6 wherein the rotating means rotates the rods in opposite directions and push the spheroidal containers upwardly.

8. Apparatus for orienting spheroidal containers comprising a spheroidal body and a neck portion extending from the body, the apparatus comprising:
 a container feeder;
 a channel having a longitudinal gap and arranged for receiving the spheroidal containers from the container feeder and operative to orient the spheroidal containers in an upside down orientation with the body supported by the channel and the neck portion extending below the spheroidal body and into the longitudinal gap;
 a twister for receiving the spheroidal containers in the upside down orientation and inverting the spheroidal containers as the spheroidal containers travel through the twister; and
 a détente mounted above the channel for limiting passage of spheroidal containers through the channel to one at a time.

9. An apparatus for orienting spheroidal containers comprising a spheroidal body and a neck portion extending from the body, the apparatus comprising:
 a container feeder;
 a channel having a longitudinal gap and arranged for receiving the spheroidal containers from the container feeder and operative to orient the spheroidal containers in an upside down orientation with the body supported b the channel and the neck portion extending below the spheroidal body and into the longitudinal gap; and
 a twister for receiving the spheroidal containers in the upside down orientation and inverting the spheroidal containers as the spheroidal containers travel through the twister, wherein the twister pneumatically moves the spheroidal containers through the twister.

10. An apparatus for packaging a beverage in spheroidal containers comprising a spheroidal body and a neck portion extending from the body, the apparatus comprising:
 a container feeder comprising a hopper;
 a channel having a longitudinal gap and arranged for receiving the spheroidal containers from the container feeder and operative to orient the spheroidal containers in an upside down orientation with the body supported by the channel and the neck portion extending below the spheroidal body into the longitudinal gap;
 a twister for receiving the spheroidal containers in the upside down orientation and inverting the spheroidal containers as the spheroidal containers travel through the twister, wherein the channel is sloped downwardly from the container feeder to the twister;
 a filler for receiving the spheroidal containers from the twister and filling the spheroidal containers with the beverage; and
 a sealer for sealing the beverage in the spheroidal containers.

11. Apparatus as in claim 10 wherein the channel comprises juxtaposed side members with a longitudinal gap therebetween, the channel arranged for receiving the spheroidal containers from the container feeder and operative to orient the spheroidal containers in an upside down orientation with the body supported by the side members and the neck portion extending below the spheroidal body and through the gap and wherein the twister comprises a tube with a helical opening extending longitudinally along the tube for receiving the neck portion of the spheroidal containers in the upside down orientation so that the spheroidal containers are inverted as the spheroidal containers travel through the twister and the spheroidal containers are received by the filler with the neck portion extending upwardly above the spheroidal body for filling through the neck portion.

12. Method for orienting spheroidal containers comprising a spheroidal body and a neck portion extending from the body, the method comprising:
 feeding the spheroidal containers from a hopper to a sloped channel having a longitudinal gap and orienting the spheroidal containers in an upside down orientation with the body supported by the channel and the neck portion extending below the spheroidal body into the longitudinal gap;
 feeding the spheroidal containers in the upside down orientation to a twister; and
 twisting the spheroidal containers in the twister and inverting the spheroidal containers as the spheroidal containers travel through the twister.

13. Method for orienting spheroidal containers comprising a spheroidal body and a neck portion extending from the body, the method comprising:
 feeding the spheroidal containers to a channel having a longitudinal gap and orienting the spheroidal containers in an upside down orientation with the body supported by the channel and the neck portion extending below the spheroidal body into the longitudinal gap;

feeding the spheroidal containers in the upside down orientation to a twister; and twisting the spheroidal containers in the twister and inverting the spheroidal containers as the spheroidal containers travel through the twister, wherein the channel comprises juxtaposed side members with a longitudinal gap therebetween, the step of orienting the spheroidal containers in an upside down orientation comprises supporting the body of the spheroidal containers with the side members such that the neck portion of the spheroidal containers extends below the spheroidal body and through the gap, and the twister comprises a tube with a helical opening extending longitudinally along the tube for receiving the neck portion of the spheroidal containers in the upside down orientation so that the spheroidal containers are inverted as the spheroidal containers travel through the twister.

14. Method for orienting spheroidal containers comprising a spheroidal body and a neck portion extending from the body, the method comprising:

feeding the spheroidal containers to a channel having a longitudinal gap and orienting the spheroidal containers in an upside down orientation with the body supported by the channel and the neck portion extending below the spheroidal body into the longitudinal gap;

feeding the spheroidal containers in the upside down orientation to a twister; and twisting the spheroidal containers in the twister and inverting the spheroidal containers as the spheroidal containers travel through the twister, wherein the channel comprises a pair of rods rotatably mounted along respective ones of the side members adjacent the longitudinal gap and the step of orienting the spheroidal containers in the upside down orientation comprises rotating the rods and engaging the spheroidal containers with the rotating rods.

15. Method as in claim 14 wherein the rods rotate in opposite directions and push the spheroidal containers upwardly.

16. Method for orienting spheroidal containers comprising a spheroidal body and a neck portion extending from the body, the method comprising:

feeding the spheroidal containers to a channel having a longitudinal gap and orienting the spheroidal containers in an upside down orientation with the body supported by the channel and the neck portion extending below the spheroidal body into the longitudinal gap;

feeding the spheroidal containers in the upside down orientation to a twister; and twisting the spheroidal containers in the twister and inverting the spheroidal containers as the spheroidal containers travel through the twister, wherein the step of twisting the spheroidal containers comprises pneumatically moving the spheroidal containers through the twister.

17. Method for packaging a beverage in spheroidal containers comprising a spheroidal body and a neck portion extending from the body, the method comprising:

feeding the spheroidal containers from a hopper to a sloped channel and orienting the spheroidal containers in an upside down orientation with the body supported by the channel and the neck portion extending below the spheroidal body;

feeding the spheroidal containers in the upside down orientation to the twister; and twisting the spheroidal containers in the twister and inverting the spheroidal containers as the spheroidal containers travel through the twister;

filling the spheroidal containers with the beverage; and sealing the beverage in the spheroidal containers.

18. Method as in claim 17 wherein the channel comprises juxtaposed side members with a longitudinal gap therebetween, the step of orienting the spheroidal containers in an upside down orientation comprises supporting the body of the spheroidal containers with the side members such that the neck portion of the spheroidal containers extends below the spheroidal body and through the gap, and the twister comprises a tube with a helical opening extending longitudinally along the tube for receiving the neck portion of the spheroidal containers in the upside down orientation so that the spheroidal containers are inverted as the spheroidal containers travel through the twister and the spheroidal containers are received by the filler with the neck portion extending upwardly above the spheroidal body for filling through the neck portion.

* * * * *